United States Patent
Grandin et al.

(10) Patent No.: US 9,443,335 B2
(45) Date of Patent: Sep. 13, 2016

(54) USING NARROW FIELD OF VIEW MONOCHROME CAMERA FOR PRODUCING A ZOOMED IMAGE

(71) Applicant: Blackberry Limited, Waterloo (CA)

(72) Inventors: Thomas Guillaume Grandin, Kitchener (CA); Joey Shah, Cambridge (CA); Yun Seok Choi, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 129 days.

(21) Appl. No.: 14/030,353

(22) Filed: Sep. 18, 2013

(65) Prior Publication Data
US 2015/0078678 A1 Mar. 19, 2015

(51) Int. Cl.
| | | |
|---|---|---|
| G06K 9/36 | (2006.01) |
| G06T 11/60 | (2006.01) |
| H04N 5/225 | (2006.01) |
| H04N 5/232 | (2006.01) |

(52) U.S. Cl.
CPC ............ *G06T 11/60* (2013.01); *H04N 5/2258* (2013.01); *H04N 5/23232* (2013.01); *G06T 2207/10004* (2013.01); *G06T 2207/10024* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 6,639,626 B1* | 10/2003 | Kubo | .................. | H04N 5/2258 348/218.1 |
| 7,035,481 B2* | 4/2006 | Kim | ....................... | G06T 3/403 382/300 |
| 7,486,291 B2* | 2/2009 | Berson | ................... | G01C 23/00 340/980 |
| 7,667,762 B2* | 2/2010 | Jenkins | ................. | H04N 9/045 348/263 |
| 8,379,134 B2* | 2/2013 | Foster | ........................ | 348/345 |
| 8,681,250 B2* | 3/2014 | Culbert | ............... | H04N 5/2253 348/223.1 |
| 2003/0151685 A1* | 8/2003 | Ia Grone | ............... | H04N 9/097 348/262 |
| 2006/0119710 A1* | 6/2006 | Ben-Ezra | ................. | G06T 5/50 348/208.99 |
| 2006/0249679 A1* | 11/2006 | Johnson et al. | ............. | 250/332 |
| 2007/0235634 A1* | 10/2007 | Ottney et al. | .......... | 250/214 VT |
| 2007/0247517 A1* | 10/2007 | Zhang et al. | ................... | 348/30 |
| 2008/0099678 A1* | 5/2008 | Johnson et al. | ............. | 250/332 |
| 2009/0050806 A1* | 2/2009 | Schmidt et al. | ............. | 250/332 |
| 2009/0065695 A1* | 3/2009 | DeMarco et al. | ............ | 250/330 |
| 2010/0045809 A1* | 2/2010 | Packard | ...................... | 348/222.1 |
| 2011/0074931 A1* | 3/2011 | Bilbrey et al. | .................. | 348/48 |
| 2011/0122308 A1* | 5/2011 | Duparre | ........................ | 348/340 |

(Continued)

FOREIGN PATENT DOCUMENTS

CA 2806077 9/2013

OTHER PUBLICATIONS

Glenn Hines; Zia-Ur Rahman; Daniel Jobson; Glenn Woodell, Multi-image registration for an enhanced vision system, http://techreports.larc.nasa.gov/ltrs/PDF/2003/mtg/NASA-2003-aerosense-gdh.pdf, 2003.*

(Continued)

*Primary Examiner* — Andrae S Allison
(74) *Attorney, Agent, or Firm* — Rowand LLP

(57) ABSTRACT

Methods and electronic devices for producing a zoomed image using a narrow field of view monochrome camera are described. In one aspect, the method includes: receiving a color image that is captured by a color camera; receiving an achromatic image that is captured by a monochrome camera with the monochrome camera having a narrower field of view than the color camera; and merging the color image and the achromatic image to produce an enhanced image.

16 Claims, 5 Drawing Sheets

(56) References Cited

U.S. PATENT DOCUMENTS

2012/0162465 A1* 6/2012 Culbert ............... H04N 5/2253
                                                          348/223.1
2013/0021447 A1   1/2013 Brisedoux et al.

OTHER PUBLICATIONS

EPO, Extended European Search Report relating to Application No. 14185464.6, dated Feb. 13, 2015.

* cited by examiner

USING NARROW FIELD OF VIEW MONOCHROME CAMERA FOR PRODUCING A ZOOMED IMAGE

TECHNICAL FIELD

The present disclosure relates to image manipulation, and more particularly, to methods and electronic devices for producing a zoomed image using images captured from different types of cameras.

BACKGROUND

Electronic devices such as smartphones and tablet computers are often equipped with one or more cameras. For example, electronic devices may be equipped with a front-facing camera, which is oriented to capture an image of a subject located near a side of the electronic device which includes the main display of the electronic device. Electronic devices may also be equipped with a rear facing camera, which is oriented to capture an image of a subject located near a side of the electronic device which does not include the main display of the electronic device.

Electronic devices equipped with cameras often provide various features and functionalities for the cameras. A user of the electronic device may control camera features to capture an image based on the user's preferences. Features of the cameras that may be controlled include the camera lens aperture size, shutter speed, external flash, zooming, focusing, etc.

Some electronic devices provide cameras that allow for zooming features. Such zooming features may be provided in one of two ways, digital zoom and/or optical zoom. Digital zoom is a method of decreasing the field of view of a captured image by cropping the image down to an area (that is commonly a centered area) with the same aspect ratio as the captured image. The cropped image may then be interpolated back up to the dimension of the captured image to produce a zoomed image. In contrast, optical zoom optically increases the size of an image. Optical zoom features are commonly implemented by using movable lenses within the camera to decrease the field of view in order to capture a zoomed image.

Unfortunately, both digital zoom and optical zoom have their drawbacks. Digital zoom provides a zoomed image that suffers from detail loss as a cropped area of an image is expanded without adding any new detail to the zoomed image. While, optical zoom requires added parts within the camera in order for its implementation which increases the size and cost of the camera.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one aspect, the present application describes a processor-implemented method for producing an enhanced image. The method includes: receiving a color image that is captured by a color camera; receiving an achromatic image that is captured by a monochrome camera with the monochrome camera having a narrower field of view than the color camera; and merging the color image and the achromatic image to produce an enhanced image.

In another aspect, the present application describes an electronic device. The electronic device includes a memory, a color camera and a monochrome camera. The monochrome camera has a narrower field of view than the color camera. The electronic device also includes a processor coupled with the memory, the color camera, and the monochrome camera. The processor is configured to: receive a color image that is captured by the color camera; receive an achromatic image that is captured by the monochrome camera; and merge the color image and the achromatic image to produce an enhanced image.

In yet another aspect, the present application describes a non-transitory computer-readable storage medium. The computer-readable storage medium has stored thereon computer executable instructions for producing an enhanced image. The computer executable instructions include instructions for: receiving a color image that is captured by a color camera; receiving an achromatic image that is captured by a monochrome camera with the monochrome camera having a narrower field of view than the color camera; and merging the color image and the achromatic image to produce an enhanced image.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Smartphone Electronic Device

Figure 1:
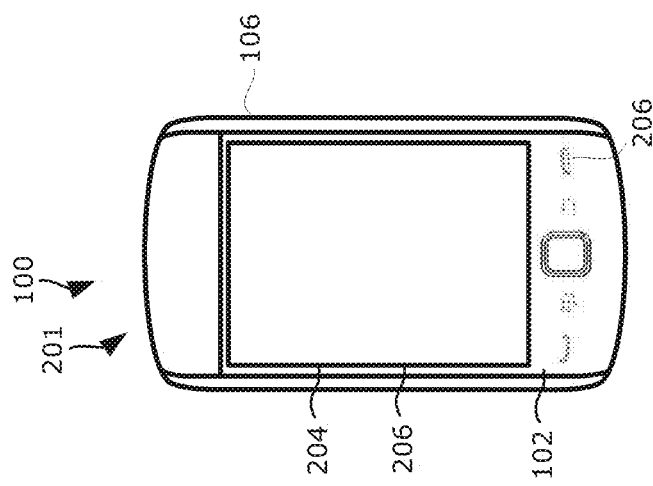
FIG. 1 is a front view of an example electronic device in accordance with example embodiments of the present disclosure.

Referring first to FIG. 1, an example embodiment of an electronic device 201 is provided. In FIG. 1, a front view of the example electronic device 201 is illustrated. The electronic device 201 may take a variety of forms. In the example shown, the electronic device 201 is a mobile communication device capable of at least voice communications. More specifically, in the example embodiment illustrated, the electronic device 201 is a smartphone 100.

The smartphone 100 is a mobile phone which offers more advanced computing capability than a basic non-smartphone cellular phone. For example, the smartphone 100 may have the ability to run third party applications which are stored on the smartphone 100. The smartphone 100 may also provide for data communication capabilities as well as voice communication capabilities. It will be appreciated that in at least some example embodiments, the electronic device 201 may be of other forms.

The electronic device 201 may include components that are discussed in greater detail below with reference to FIG. 4 or a subset of these components. The electronic device 201 includes a housing 106 which houses these components of the electronic device 201.

In the example embodiment illustrated, the electronic device 201 includes a display 204, which may be a touchscreen display which acts as an input interface 206. The display 204 is disposed within the electronic device 201 so that it is viewable at a front side 102 of the electronic device 201. That is, a viewable side of the display 204 is disposed on the front side 102 of the electronic device 201. In the example embodiment illustrated, the display 204 is framed by the housing 106.

The example electronic device 201 may include other input interfaces 206 such as one or more buttons, keys or navigational input mechanisms. In the example embodiment illustrated, at least some of these additional input interfaces 206 are disposed for actuation at a front side 102 of the electronic device 201.

Figure 2:
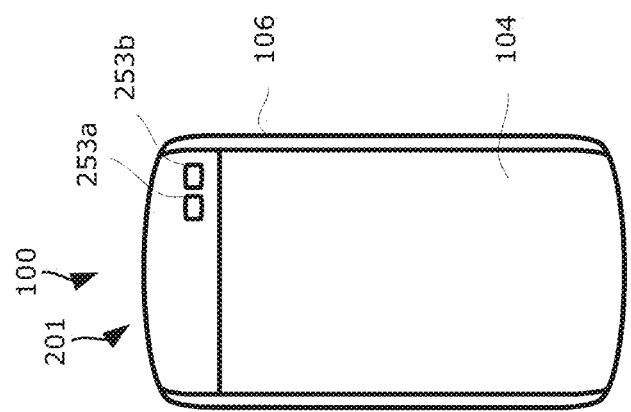
FIG. 2 is a rear view of the example electronic device in accordance with example embodiments of the present disclosure.

Referring now to FIG. 2, the example electronic device 201 also includes rear facing cameras 253a, 253b on a rear side 104 of the electronic device 201. That is, the rear facing cameras 253a, 253b are located on a side of the electronic device 201 which does not include the display 204. More particularly, the rear facing cameras 253a, 253b are located so that they may capture images of subjects which are located in the rear of the electronic device 201 and/or surrounding the rear side 104 of the electronic device 201. In at least some example embodiments, the electronic device 201 may operate in an operating mode in which the display 204, on the front side 102 of the electronic device 201, acts as a viewfinder displaying image data associated with the rear facing cameras 253a, 253b on the rear side 104 of the electronic device 201.

The rear facing cameras 253a, 253b may provide various features and functionalities for capturing images. For example, each of the respective rear facing cameras 253a, 253b may allow for control of aperture size, shutter speed, external flash, digital zoom, focus, color and/or achromatic image capture, etc. The rear facing cameras 253a, 253b may have same or different capabilities from one another.

In at least some example embodiments, one of the rear facing cameras may be a color camera 253a (i.e. configured to capture color images), and the other rear facing camera may be a monochrome camera 253b (i.e. configured to capture only achromatic images). Additionally, the monochrome camera 253b may have a narrower field of view than the color camera 253a. That is, the monochrome camera 253b may image a narrower angular extent of a scene than the color camera 253a (i.e. the image captured by the monochrome camera 253b may have an enlarged and lesser view of a scene than the image captured by the color camera 253a). In such example embodiments, images captured by both the color camera 253a and the monochrome camera 253b may be used to produce a single image. For example, the color camera 253a may capture a color image (at a wide field of view) and the monochrome camera 253b may capture an achromatic image (at a narrow field of view), and the captured images may be merged to produce an enhanced image. Greater details of such example embodiments will be provided below with reference to FIGS. 4 and 5.

The rear facing cameras 253a, 253b are directionally aligned and positioned relative to one another in order that the images are captured at particular views, and may be merged to produce the enhanced imaged. As illustrated, in at least some example embodiments, the rear facing cameras 253a, 253b are positioned side-by-side with the distance between the rear facing cameras 253a, 253b being minimized. In such cases, the offset between the images captured by the rear facing cameras 253a, 253b are minimal due to the close proximity of the rear facing cameras 253a, 253b. For example, the rear facing cameras 253a, 253b may be aligned in a common direction and positioned with respect to one another so that the image captured by one of the rear facing cameras (e.g. the monochrome camera 253b) is substantially centered on the image captured by the other rear facing camera (e.g. the color camera 253a).

Although the rear facing cameras 253a, 253b are illustrated positioned horizontally with respect to one another and at a top edge of the electronic device 201, in at least some example embodiments, the rear facing cameras 253a, 253b may be differently positioned. For example, the positioning of the rear facing cameras 253a, 253b may be switched, vertical with respect to one another, in another portion on the rear side 104 of the electronic device 201, etc. The rear facing cameras 253a, 253b may be positioned in any manner in which distances between the rear facing cameras 253a, 253b are minimized so that there is minimal offset between the images the rear facing cameras 253a, 253b capture, and the images may be merged to produce an enhanced image.

In at least some example embodiments, the electronic device 201 may also include one or more front facing cameras instead of, or in addition to, the rear facing cameras 253a, 253b. The front facing cameras may be located on the front side 102 of the electronic device 201. The front facing cameras are located so that they may capture images of subjects which are located in front of and/or surrounding the front side 102 of the electronic device 201. In such example embodiments, the front facing cameras may have the same functionalities and features of the rear facing cameras 253a, 253b as described above.

Similarly, in at least some example embodiments, one or more cameras may, instead of or in addition to the rear and/or front facing cameras, be located in other areas of the electronic device 201. For example, one or more cameras may be located on any one or more of the edges of the electronic device 201. In such example embodiments, a plurality of cameras located on one of the edges of the cameras may have the same functionalities and features of the rear facing cameras 253a, 253b as described above.

Example Cameras

As mentioned above, in at least some example embodiments, the rear facing cameras 253a, 253b of the electronic device 201 (FIGS. 1 and 2) may include a color camera 253a and a monochrome camera 253b.

The color camera 253a is configured to capture color images. More particularly, the color camera 253a may include a color sensor that is capable of capturing color information of a scene to produce a color image. For example, the color sensor may include an image sensor and a color filter array. The image sensor receives and converts optical images into electronic signals that convey image information. The color filter array is a mosaic of tiny color filters placed over pixels of the image sensor to capture color information. The color filters filter light from a scene by wavelength range so that filtered wavelengths that provide corresponding color information are captured by different pixels on the image sensor. That is, a particular type of color information may be captured at a pixel of the image sensor based on the overlaying color filter. Accordingly, only a certain amount of incoming light is captured by the image sensor as the pixels only receive portions of light that have been filtered based on color. For example, for the commonly implemented Bayer filter which is a mosaic of Red-Green-Green-Blue filters (i.e. a filter pattern of 50% green, 25% red and 25% blue), only one of these three primary colours in incoming light is captured at each pixel. In at least some example embodiments, other types of color filter arrays may be implemented such as a Red-Green-Blue-Emerald filter, Cyan-Yellow-Yellow-Magenta filter, Cyan-Yellow-Green-Magenta filter, etc. The filtered and captured light is then converted to a full color image by a demosaicing algorithm. More specifically, the demosaicing algorithm interpolates for missing colours in each of the pixels to create a completely coloured image. However, the use of a color sensor results in a loss of image detail when compared to an achromatic sensor (of a monochrome camera 253b) as each pixel of the color sensor corresponds to only one particular color for filtering light.

The monochrome camera 253b is configured to only capture achromatic images (i.e. images without color such as "black-and-white" images). That is, the monochrome camera 253b may not be capable of capturing colour information in light from a scene. For example, the monochrome camera 253b includes an image sensor (which may be similar to the image sensor of the color camera 253a) which may detect light intensity but with minimal wavelength specificity. As the image sensor may not identify the range of wavelengths in light, the image sensor may not separate color information in light. Instead, the image sensor captures all incoming light to produce an achromatic image.

The detail level achievable by each type of camera may be illustrated by referring to each of the cameras 253a, 253b modulation transfer function as a function of the spatial frequency. The modulation transfer function is a measure of normalized intensity of patterns in an image (i.e. a measure of normalized difference in luminance (brightness) and/or color between bright and dark patterns in an image which may indicate how discernible these patterns are within the image), and the spatial frequency is the frequency of these patterns. By providing such a representation which describes a level of change in brightness and/or color in response to patterns of varying spatial frequency, the various detail levels of each of the cameras 253a, 253b may be depicted.

Figure 3:
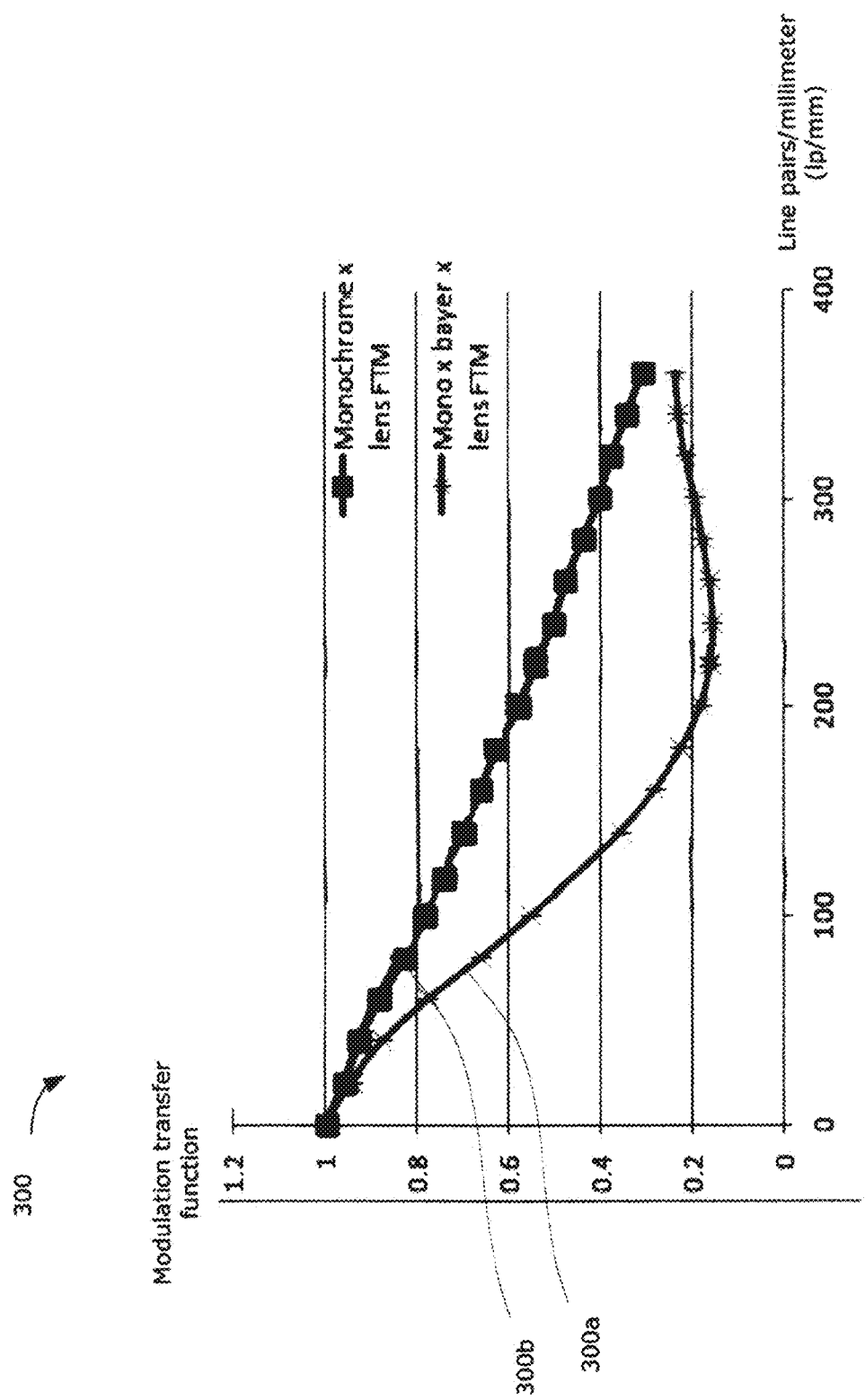
FIG. 3 is example graphical representations of modulation transfer function as a function of spatial frequency for a color camera and a monochrome camera in accordance with example embodiments of the present disclosure.

Reference is now made to FIG. 3, which shows such example graphical representations of modulation transfer function as a function of spatial frequency for both an example color camera and a monochrome camera. The modulation transfer function may be a value from 0 to 1 (with 1 representing perfect rendering of detail in an image and 0 representing no visibility of the detail in the image). The spatial frequency of details can be provided as a number of line pairs per millimeter (lp/mm) (which is a measure of detail level that is quantified by how close lines may be next to each other in an image space).

As shown, graph 300a represents the modulation transfer function as a function of spatial frequency for a color camera, and graph 300b represents the modulation transfer function as a function of spatial frequency for a monochrome camera. In the 100 lp/mm to 300 lp/mm range of spatial frequencies, graph 300a has modulation transfer function values between 0.2 and 0.6. At these modulation transfer function values, the spatial frequencies for graph 300b are approximately double the values than for graph 300a. For example, at a modulation transfer function value of 0.6, the color camera provides approximately 90 lp/mm while the monochrome camera provides approximately 190 lp/mm. Accordingly, the monochrome camera provides approximately twice the level of detail than the color camera along both width and height axes for captured images in the particular range of spatial frequencies.

As mentioned above, in at least some example embodiments, the images captured by the color camera 253a and the monochrome camera 253b may be combined to produce an enhanced image. For example, the detail information of the images captured by the monochrome camera 253b may be combined with the color information of the images captured by the color camera 253a to produce the enhanced image. As such, an enhanced image that is both coloured and at a high detail level may be created.

Example Electronic Device

Figure 4:
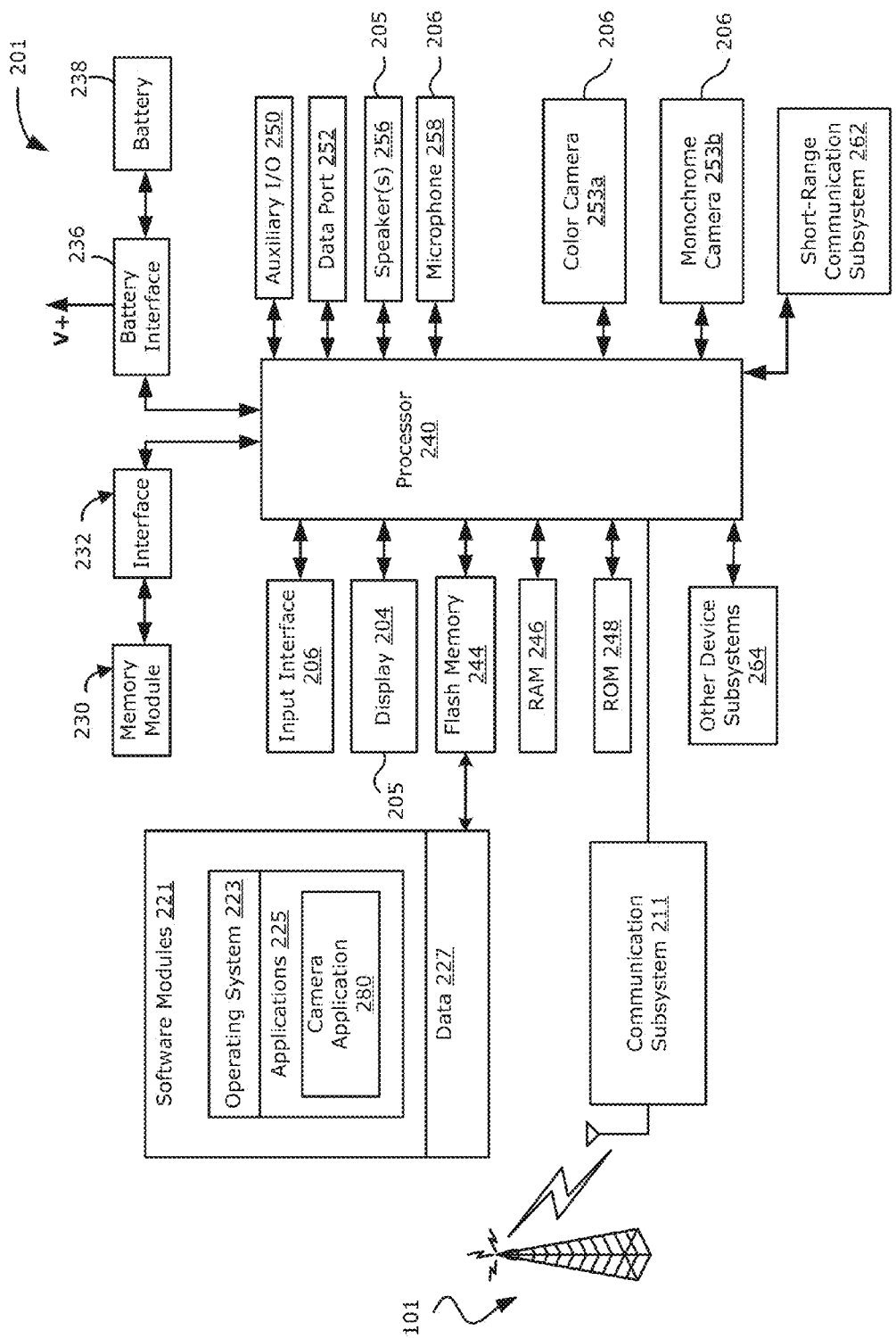
FIG. 4 is a block diagram illustrating an example electronic device in accordance with example embodiments of the present disclosure.

Reference is next made to FIG. 4 which illustrates a block diagram of the example electronic device 201. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments, the electronic device 201 may be a multiple-mode communication device configured for both data and voice communication, a mobile telephone such as the smartphone 100 (FIGS. 1 and 2), a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device includes a housing 106 (FIGS. 1 and 2), housing the components of the electronic device 201. The internal components of the electronic device 201 are constructed on a printed circuit board (PCB). The electronic device 201 includes a controller including at least one processor 240 (such as a microprocessor) which controls the overall operation of the electronic device 201. In at least some example embodiments, the controller may, instead of or in addition to the processor 240, include an analog circuit or other types of circuits capable of performing a part or all of the functions of the processor 240 that are described herein. The processor 240 interacts with device subsystems such as a communication subsystem 211 for exchanging radio frequency signals with a wireless network 101 to perform communication functions. The processor 240 may be communicably coupled with additional device subsystems including one or more output interfaces 205 (such as a display 204, one or more speakers 256, and/or other output interfaces 205), one or more input interfaces 206 (such as a color camera 253a, a monochrome camera 253b, a microphone 258, a keyboard (not shown), control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range communication subsystem 262 and other device subsystems generally designated as 264. Some of the subsystems shown in FIG. 4 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The particular design of the communication subsystem 211 depends on the wireless network 101 in which the electronic device 201 is intended to operate. The wireless network 101 may include one or more of a Wireless Wide Area Network (WWAN) and/or a Wireless Local Area Network (WLAN) and/or other suitable network arrangements. In some example embodiments, the electronic device 201 is configured to communicate over both the WWAN and WLAN, and to roam between these networks. The electronic device 201 may send and receive communication signals over the wireless network 101 via the communication subsystem 211 after the required network registration or activation procedures have been completed.

In at least some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (i.e. touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a color camera 253a and a monochrome camera 253b. The cameras 253a, 253b are capable of capturing camera data, such as images, in the form of still photos and/or motion data. As mentioned above, the camera data may be captured in the form of electronic signals which are produced by an image sensor associated with each of the cameras 253a, 253b. More specifically, the color camera 253a may include an image sensor with an integrated or overlaying color filter array so as to capture camera data that defines colored images. The monochrome camera 253b may also include an image sensor (which may or may not be similar to the image sensor of the color camera 253a) but without a color filter array so as to only capture camera data that defines achromatic images.

In at least some example embodiments, the monochrome camera 253b may have a narrower field of view than the color camera 253a. The field of view describes the angular extent of a given scene imaged by a camera. The field of view may depend upon the focal length, and on image sensor size. The focal length is a measure of the strength of convergence (or divergence) of light for magnification, and may be a distance between the image sensor and an optical center of an associated lens of a camera. That is, an increase in the focal length (e.g. by increasing the distance between the image sensor and the lenses) causes magnification of an image (and a decreased view of a scene), while a decrease in the focal length (e.g. by decreasing the distance between the image sensor and the lenses) causes diminishment of the image (and an increased view of the scene). In at least some example embodiments, the monochrome camera 253b and the color camera 253a may have the same sensor sizes but the monochrome camera 253b has a longer focal length than the color camera 253a. Similarly, in at least some example embodiments, the monochrome camera 253b and the color camera 253a may have the same focal length but the monochrome camera 253b has a smaller sensor size than the color camera 253a. Accordingly, the images captured by the monochrome camera 253b may have a narrower view of a scene as opposed to the images captured by the color camera 253a which may have a wider view of the same scene. That is, images captured by the monochrome camera 253b may appear "zoomed" in contrast to the images captured by the color camera 253a.

Additionally, in at least some example embodiments, the color camera 253a and/or the monochrome camera 253b are equipped with an auto-focusing system. That is, one or both of the cameras 253a, 253b may have the ability to change the lens position and/or optical image position with respect to the image sensor in order to focus on an image. In such cases, as part of the auto-focusing system, the camera may include components (such as actuators) that may move the lens in relation to the image sensor in order to focus on an image.

In at least some example embodiments, the color camera 253a and/or the monochrome camera 253b are fixed-focus. That is, one or both of the cameras 253a, 253b may not have the ability to change the lens and/or optical image position in relation to the image sensor in order to focus on a subject. The distance between the image sensor and the lens may not be varied. In such cases, the fixed-focus camera captures images at its pre-set focusing distance, and may not be able to focus on a subject. The fixed-focus camera may not include components (such as actuators) that may move the lenses in relation to the image sensor to change the distance between the lenses and the image sensor.

In order to achieve the narrow field of view of the monochrome camera 253b, in at least some example embodiments, various types of configurations of the monochrome camera 253b may be implemented. For example, the monochrome camera 253b may include various types of lens structures. These lens structures may, for example, include one or more reflective surfaces such as mirrors. In such cases, incoming light path may be folded by reflection of the one or more mirrors allowing for a long path of travel of the light prior to receipt at the image sensor. As such, a long focusing distance is created (by the long path of travel of the incoming light) within a smaller configuration of a lens structure than for a conventional lens structure.

As mentioned above, in at least some example embodiments, camera data obtained from both of the cameras 253a, 253b may be used to produce a single image. For example, the color camera 253a may capture a color image and the monochrome camera 253b may capture an achromatic image. The achromatic image may be a zoomed version of the color image (as the monochrome camera 253b captures images at a narrower field of view than the color camera 253a), and may be of a higher detail level than the color image (recall that a monochrome camera captures more details of an image than a color camera). These captured images may then be merged to produce an enhanced image. The enhanced image may include features from both of the images. For example, the enhanced image may include the color information from the color image and the high level of detail information from the achromatic image. Moreover, in at least some example embodiments, the enhanced image may have a common resolution as the color image and a common view as the color image. Greater details of such an enhanced image are provided below.

As mentioned above, the cameras 253a, 253b may both be configured as front facing cameras or may both be configured as rear facing cameras (FIG. 2). Front facing cameras are cameras 253a, 253b located and directed to capture images from a front side of the electronic device 201 (i.e. a side that includes the main display 204). Rear facing cameras are cameras 253a, 253b located and directed to capture images from a rear side 104 of the electronic device 201 (i.e. a side that does not include the main display 204). Accordingly, the rear facing cameras may obtain images which are not within the field of view of the front facing cameras. The field of view of the front facing and rear facing cameras may generally be in opposing directions.

In at least some example embodiments, the cameras 253a, 253b are aligned in a common direction and positioned relative to one another so that the images they capture are minimally offset from another. In such example embodiments, the cameras 253a, 253b are in close proximity to one another. For example, the cameras 253a, 253b may be positioned side-by-side. More particularly, the cameras 253a, 253b may be aligned and positioned in such a manner (where distances between the cameras 253a, 253b are minimal) so that the captured achromatic image is substantially centered on the captured color image.

While FIG. 4 illustrates two cameras (a color camera 253a and a monochrome camera 253b), the electronic device 201 may include more than two cameras 253a, 253b. For example, in at least some example embodiments, the electronic device 201 may include both front facing cameras and rear facing cameras. Moreover, in at least some example embodiments, the electronic device may include more than two cameras on the front side 102 (FIG. 1) and/or the rear side 104 (FIG. 2) of the electronic device 201.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

The electronic device 201 also includes or is connectable to a power source such as a battery 238. The battery 238 may be one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, camera data, calendar and schedule information, notepad documents, images (captured by the color camera 253a and the monochrome camera 253b), and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, images, and task items may be stored in individual databases within the memory.

A predetermined set of applications that control basic device operations, including data and possibly voice communication applications may be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using an input interface 206 in conjunction with the display 204. These composed items may be transmitted through the communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 4, the software modules 221 include operating system software 223 and other software applications 225 including a camera application 280.

The software applications 225 on the electronic device 201 may also include a range of additional applications including, for example, a notepad application, internet browser application, a voice communication (i.e. telephony) application, a mapping application, and/or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

The processor 240 may be electrically connected to the cameras 253a, 253b to allow the processor 240 to receive electronic signals representing camera data from the cameras 253a, 253b.

In at least some embodiments, the software modules 221 may include one or more camera applications 280 or software modules which are configured for handling the electronic signals representing camera data from the cameras 253a, 253b. The camera application 280 may, for example, be configured to provide a viewfinder on the display 204 by displaying, in real time or near real time, images defined in the electronic signals received from the cameras 253a, 253b. The camera application 280 may also be configured to capture images or videos by storing images or videos defined by the electronic signals received from the cameras 253a, 253b. For example, the camera application 280 may be configured to store the images or videos to memory, for example the flash memory 244, of the electronic device 201. The images may be stored in various formats including JPEG, RAW, BMP, etc. The videos may also be stored in various formats including MPEG, WMV, 3GP, etc.

The camera application 280 may also be configured to control options or features associated with the cameras 253a, 253b. For example, the camera application 280 may be configured to control camera lens apertures and/or shutter speeds associated with the cameras 253a, 253b. The control of such features may, in at least some example embodiments, be automatically performed by the camera application 280 based on output received from a light exposure meter, or based on other criteria. In at least some example embodiments, the camera application 280 may be configured to control a flash associated with the cameras 253a, 253b. The camera application 280 may, in at least some example embodiments, provide access to image stabilization for the cameras 253a, 253b. Image stabilization may reduce blurring and/or motion artifacts associated with movement of the cameras 253a, 253b.

In at least some embodiments, the camera application 280 may be configured to allow the cameras 253a, 253b to focus on a subject (i.e. an identifiable item, such as an individual or thing). For example, the camera application 280 may be configured to control actuators of the cameras 253a, 253b to move lenses (a lens may be comprised of one or more lens elements) in the cameras 253a, 253b relative to image sensors in the cameras 253a, 253b (i.e. vary the focal lengths of the cameras 253a, 253b). In at least some embodiments, the camera application 280 may provide for auto-focusing capabilities. For example, the camera application 280 may analyze received electronic signals to determine whether the images captured by the cameras 253a, 253b are in focus. That is, the camera application 280 may determine whether the images defined by electronic signals received from the cameras 253a, 253b are focused properly on the subject of such images. The camera application 280 may, for example, make this determination based on the sharpness of such images. If the camera application 280 determines that the images are not in focus, then the camera application 280 may cause the processor 240 to adjust one or more of the actuators which controls the lenses to focus the images. In at least some example embodiments, other components of the cameras 253a, 253b, may additionally or instead of the lenses, be controlled for focusing purposes (e.g. adjusting a line of sight of the cameras 253a, 253b). For example, one or more of the cameras 253a, 253b may include an adjustable tilting device coupled to the image sensor in order to adjust the line of sight of the cameras.

In at least some example embodiments, the camera application 280 may not provide for focusing capabilities. That is, the focusing distance of the cameras 253a, 253b may not be adjusted, and images are captured at pre-configured focusing distances for the cameras 253a, 253b. More particularly, the cameras 253a, 253b do not include controllable components (such as actuators), and the distance between the lenses and the image sensor may not be adjusted. Similarly, other controllable features (such as a tilting device) may not be present within the cameras 253a, 253b.

In at least some example embodiments, none, one or both of the cameras 253a, 253b may include such focusing capabilities.

In at least some example embodiments, the camera application 280 may be configured to control zooms associated with the cameras 253a, 253b. For example, the camera application 280 is configured to provide digital zoom features. The camera application 280 may provide digital zoom features by cropping an image down to a centered area with the same aspect ratio as the original image. In at least some example embodiments, the camera application 280 may further interpolate the cropped image to bring the cropped image back up to the pixel dimensions of the original image.

Digital zooming may be differentiated from optical zoom in that the latter allows for an image to be zoomed by controlling the optical field of view in order that the image is drawn closer. An optical zoom is considered a "true" zoom as the optics of the camera are adjusted so that the zoomed image may be captured by the full resolution of the image sensor. In contrast, a digital zoom is not considered a "true" zoom as a portion of the image is selected and expanded to the size of the original image, without a change in the detail of the zoomed image. That is, the image has been expanded without adding new detail information to the image (as such, the "zoomed" image is not captured at a full resolution of the image sensor).

In at least some example embodiments, the camera application 280 may be configured to produce a digitally zoomed image with reduced loss of detail. More particularly, the camera application 280 may allow for the capture of an image that is digitally "zoomed" and at a higher image quality (i.e. image resolution) than when captured by a conventional digital zoom. In such example embodiments, the camera application 280 may operate in an operating mode so that images captured by the cameras 253*a*, 253*b* may be merged to produce an enhanced image which is at a high image resolution and is zoomed.

More specifically, the camera application 280 may be configured to merge a color image captured by the color camera 253*a* with an achromatic image captured by the monochrome camera 253*b* to produce an enhanced image (the color image and the achromatic image may be captured at the same time or approximately the same time by the cameras 253*a*, 253*b*). The monochrome camera 253*b* may have a narrower field of view than the color camera 253*a*. In at least some example embodiments, the color camera 253*a* and the monochrome camera 253*b* may further be at a common resolution for capturing images. For example, both the cameras 253*a*, 253*b* may have a resolution of 8 mega pixels (MP). This means that the cameras 253*a*, 253*b* may capture images consisting of approximately 8 million pixels. In such example embodiments, the produced enhanced image may include the high detail information from the achromatic image (which has a higher detail level than the color image) (and/or the color image), the color information from the color image, and/or be a zoom of the color image (and/or the achromatic image).

For example, the camera application 280, may receive an instruction to adjust a digital zoom level of the color camera 253*a*, prior to the capture of one or more of the images by the cameras 253*a*, 253*b*. The camera application 280 may provide an option to adjust a digital zoom level associated with the color camera 253*a*. For example, a user may input an instruction (via an input interface 206 associated with the electronic device 201) to selectively adjust the digital zoom level of the color camera 253*a*. In at least some example embodiments, the effect of the adjustment of the digital zoom level on the color image to be captured by the color camera 253 may be viewed on a viewfinder on the display 204. For example, the camera application 280 may provide a viewfinder on the display 204 displaying the color image associated with the color camera 253*a*. In such cases, a user may preview zooms of the image on the viewfinder on the display 204, with the zoom displayed being dependent upon the zoom level to be selected. In at least some example embodiments, the camera application 280 may provide a viewfinder on the display 204 which displays a preview of an enhanced image that may result from the combination of the color image and the achromatic image.

The instruction to adjust the digital zoom level of the color camera 253*a* may not alter the functionalities of the color camera 253*a* when capturing the color image. Rather, the instruction commands the camera application 280 to crop the color image after the color image has been captured, and without affecting the manner in which the color image is captured. Accordingly, the term "adjusting the digital zoom level of the color camera 253*a*" may not imply actual adjustment of zooming features and functionalities of the color camera 253*a* for capturing the color image.

In at least some example embodiments, these zoom levels may be a set of discrete values (e.g. a sequence of zooms of 1×, 2×, 4×, etc. of the color image) or continual values (e.g. a sequence of zooms such as 1.0×, 1.1×, 1.2×, 1.3× etc. of the color image). These discrete and continual zoom level values are values relative to the image captured by the color camera 253*a*. In such cases, a zoom by a particular amount (e.g. 2×) is not indicative of a proportional magnification of the original image (i.e. color image) over the cropped image. Rather, for example, a zoom of 2× means that half of the height and half of the width of the original image (i.e. color image) is captured. As such, the cropped image is only a quarter of the original image (i.e. color image) at a zoom of 2×.

In response to receiving the instruction, the camera application 280 adjusts the digital zoom level of the color camera 253*a*. That is, images captured by the color camera 253*a* are to be cropped by a particular magnification that is based on the digital zoom level selected (and a ratio between field of view of the two cameras 253*a*, 253*b*). In such cases, after an image is captured by the color camera, the captured image is cropped based on the adjusted digital zoom level. That is, the color image is cropped depending on the desired zoom level selected.

Although the above example embodiments describe the adjustment of the digital zoom level of the color camera 253*a*, in at least some example embodiments, the digital zoom level of the monochrome camera 253*b* may also be adjusted. For example, an instruction to adjust the digital zoom level of the monochrome camera 253*b* may be input (for example, via the input interface 206) and received by the camera application 280. In response to receiving the instruction, the camera application 280 adjusts the digital zoom level of the monochrome camera 253*b*. As such, images captured by the monochrome camera 253*b* are to be cropped to achieve a particular magnification that is based on the digital zoom level selected (and a ratio between field of views of the two cameras 253*a*, 253*b*).

In such example embodiments, as part of the merging process, the cropped color image is merged with the achromatic image to produce the enhanced image. In at least some example embodiments, the achromatic image may be cropped, and the cropped achromatic image may instead be merged with the cropped (or even the non-cropped) color image to produce the enhanced image (depending on whether a digital zoom level has been selected for the monochrome camera 253*b*). Since the achromatic image provides a higher detail level than the color image, the achromatic image may be cropped and may still have a higher detail level than a similar resolution and field of view non-cropped color image. The enhanced image may have a common resolution as the color image. For example, if the color image was captured at a resolution of 8 MP, the enhanced image may also be at a resolution of 8 MP. As such, an enhanced image is produced that is zoomed, and which may have a higher detail level than the color image, and accordingly is of a higher quality than the cropped color image.

Examples are now provided in order to illustrate such improvements in the quality of the enhanced image over the cropped color image or even the non-cropped color image. For example, in at least some example embodiments, the monochrome camera 253b and the color camera 253a may have a common resolution (for example, both cameras 253a, 253b may have a resolution of 8 MP at which images are captured). Additionally, the field of view of the monochrome camera 253b may cover half the view of the color camera 253a along each of width and height axis (e.g. equivalent to a 2× zoom). In such example embodiments, the achromatic image captured by the monochrome camera 253b may have a level of detail increased by a factor of four compared to the color camera 253a. This is the case because of the difference in the field of views between the two cameras 253a, 253b (the monochrome camera 253b at a narrower field of view provides twice the level of detail in comparison to the color camera's 253a field of view), and the difference in the level of details captured by the two cameras 253a, 253b (the monochrome camera 253b is capable of capturing images at twice the level of detail in comparison to the color camera 253a).

In such example embodiments, the degree of cropping of the color image (and/or the achromatic image) may depend upon the adjustment of the digital zoom level. For example, the zoom level may be adjusted to 1× i.e. there is no zoom that is being performed, and accordingly, no cropping process is being performed. In such cases, the enhanced image created from the color image and the achromatic image has a detail level that is greater than the color image by a factor of four (i.e. in areas of the enhanced image which includes an overlap of the views of the achromatic image and the color image). Such a detail level is achieved because the achromatic image includes four times as much detail as the color image (since the achromatic image is captured at half the field of view and by a monochromatic camera), and the achromatic image is combined with the color image to produce the enhanced image. In at least some embodiments, the enhanced image may have the same resolution as the color image. Accordingly, the enhanced image has the same level of detail as the color image for areas of the enhanced image that do not include an overlap of the views of the achromatic image and the color image. The enhanced image may have a higher level of detail than the color image. However, the enhanced image may have a lower level of detail than the achromatic image for areas of the enhanced image which include an overlap of the views of the achromatic image and color image due to the loss of resolution in these areas.

In at least some example embodiments, the digital zooming process (i.e. the cropping process) may be performed (or further performed) after images are captured by the cameras 253a, 253b (i.e. a color image and an achromatic image), and these images are merged to produce an enhanced image. In such example embodiments, an instruction may be inputted to digitally zoom the enhanced image at a desired level, and in response, the enhanced image is digitally zoomed (i.e. cropped). For example, in at least some example embodiments, (when images are captured at no zoom (i.e. 1×) and merged), the enhanced image may be cropped so that the enhanced image may have 16 times the resolution of the color image (i.e. four times the level of detail along the height axis and four times the level of detail along the width axis). In such cases, the enhanced image has a same level of detail but includes 16 times the amount of pixels as the color image outside of the overlapping areas of views of the combination of the achromatic image and color image. The enhanced image also has a same level of detail and four times the amount of pixels as the achromatic image in the overlapping areas of views of the combination of the achromatic image and color image. Similarly, in at least some example embodiments, the enhanced image may be cropped so that the enhanced image may instead have a resolution that is in between 1-16 times the resolution of the color image. In such cases, the enhanced image has a same level of detail but includes a greater amount of pixels as the color image outside the overlapping areas of views of the combination of the achromatic image and the color image. The enhanced image also has a greater level of detail than the color image but a lower level of detail than the achromatic image in the overlapping areas of views of the combination of the achromatic image and the color image.

In at least some example embodiments, the zoom level may be adjusted so that an image to be produced may have a view that is lesser than the color image by a factor of four, and a common view as the achromatic image. For example, the zoom level may be adjusted to 2× i.e. a quarter of the color image is cropped. In such cases, the enhanced image (which may be a combination of the color image, and the achromatic image) has a detail level that is greater than an equivalent resolution color image by a factor of two. Such a detail level is achieved because, as described above, a monochrome camera 253b may be capable of capturing twice the level of detail over an equivalent resolution color camera 253a along each of the width and height axis for an image. In this particular case, the enhanced image may be a complete overlap of the views of the color image and the achromatic image. In at least some example embodiments, the enhanced image may have a same resolution as the color image. Accordingly, the enhanced image may have a greater level of detail than the color image, but may have a lesser level of detail than the achromatic image.

As described above, in at least some example embodiments, the digital zooming process may be further performed after the images (a color image and an achromatic image) are captured, one or more of the images are cropped, and the images are then merged to produce an enhanced image. In such example embodiments (in which the color image is digitally zoomed by 2× and merged with the achromatic image to produce the enhanced image), the enhanced image may further be cropped so that the enhanced image may have four times the resolution of the color image (i.e. two times the level of detail along the height axis and two times the level of detail along the width axis). In such cases, the enhanced image may have the same level of detail as the color image. The enhanced image may also have same level of detail but includes four times the amount of pixels as the achromatic image. Similarly, in at least some example embodiments, the enhanced image may further be cropped so that the enhanced image may instead have a resolution that is in between 1-4 times the resolution of the color image. In such cases, the enhanced image has a greater level of detail than the color image but a lesser level of detail than the achromatic image.

For the illustrated example, in which the field of view of the monochrome camera 253b covers half the view of the color camera 253a, the enhanced image may have a higher quality (i.e. higher detail level) than an equivalent resolution color image (as the enhanced image) up to a zoom level of 4×.

Additionally, it will be appreciated that other zoom levels may be implemented including continuous zoom levels. In such example embodiments, the same process as discussed above may be carried out in order to produce an enhanced image. For example, upon adjustment to a selected zoom level and capture of a color image, the camera application 280 may crop the color image based on the selected zoom level. Then, as part of the merging process, the cropped color image is merged with the achromatic image to produce the enhanced image. In such cases, the detail level of the enhanced image relative to an equivalent resolution color image may depend upon the selected zoom level.

The enhanced image may also be referred to as a zoomed image for embodiments in which a zoom level greater than 1× is selected and performed. That is, in such cases, the color image is cropped and merged with the non-cropped or cropped achromatic to produce the enhanced image. As such, an enhanced image that is a "zoomed-in" version of the color image is produced.

Moreover, the difference in the field of view between the color camera 253a and the monochrome camera 253b may be varied such that the monochrome camera 253b may have a field of view that is greater or less than half the field of view of the color camera 253a. In such cases, the difference in the quality between the enhanced image and an equivalent resolution color image (i.e. produced by the color camera alone) will accordingly depend on the difference in the field of view between the two cameras 253a, 253b and the selected zoom level.

As mentioned above, in at least some example embodiment, the merging process may include combining color information, and in some cases detail information, from the cropped color image (or the color image) and detail information from the achromatic image to produce the enhanced image. In at least some example embodiments, the merging process may include layering of the images to form a combined image. More particularly, color information from the cropped color image (or the color image) is layered with the detail information from the achromatic image to form the enhanced image. In at least some example embodiments, the camera application 280 may include image manipulation tools in order to perform such a merging process. However, in at least some example embodiments, a different application or module, such as an image editing application may include the image manipulation tools to perform the merging process.

Moreover, in at least some example embodiments, the cropped color image may further be upscaled, and then merged with the achromatic image to produce an enhanced image. That is, by being upscaled, the resolution of the cropped color image is adjusted. More particularly, the resolution of the cropped color image is increased. As such, after cropping of the color image, the cropped color image may further be upscaled, and the resulting cropped and upscaled color image may be combined with the achromatic image to produce the enhanced image.

The above examples describe embodiments where the zoom level is adjusted prior to the capture of the color image. In at least some example embodiments, the zoom level may be adjusted after the capture of the color image and the achromatic image. That is, the color image and the achromatic image may be captured and stored in the electronic device 201 (for example, in the memory 244), and at a later time, the camera application 280 may receive an instruction to crop the color image. In such example embodiments, in response to receiving the instruction, the camera application 280 may retrieve the stored color image, and crop the retrieved color image to produce a cropped color image. In at least some example embodiments, the cropped color image may further be resized to the pixel dimension of the captured color image. As part of the merging process, the stored achromatic image may be retrieved and merged with the cropped and resized color image to produce the enhanced image. In such example embodiments, the enhanced image may have a greater level of detail than the color image and a common view as the cropped color image. Similarly, in at least some example embodiments, the camera application 280 may, additionally or instead of the instruction to crop the color image, receive an instruction to crop the achromatic image. In such example embodiments, in response to receiving the instruction, the camera application 280 may retrieve the stored achromatic image, and crop the retrieved achromatic image to produce a cropped achromatic image. Subsequently, as part of the merging process, the cropped achromatic image may be merged with the cropped color image (or the non-cropped color image) to produce the enhanced image. In such example embodiments, the enhanced image may a have greater level of detail than the color image and a common view as the cropped (or non-cropped) color image.

In at least some example embodiments, the camera application 280 may obtain stereoscopic image data from the cameras 253a, 253b. Such stereoscopic image data may be obtained from areas that include an overlap of the views of the color image and the monochrome image. The spacing between the cameras 253a, 253b allows for the capture of such stereoscopic image data. In such example embodiments, the camera application 280 may further obtain depth information from the stereoscopic image data, and create a depth map based on the depth information. The depth information may be utilized for various purposes including in an imaging editing application for manipulating one or more of the captured images.

The example embodiments described above include the use of two cameras 253a, 253b to capture images that are subsequently merged. In at least some example embodiments, the electronic device 201 may include additional cameras (i.e. more than two cameras) to capture one or more images that are subsequently merged with the images captured by the color camera 253a and the monochrome camera 253b, to produce an enhanced image. For example, in at least some example embodiments, the electronic device 201 may include a third camera. The third camera may be a monochrome camera which may be referred to as a "second" monochrome camera. This second monochrome camera has a narrower field of view than the color camera 253a, but may have a same field of view as or different (i.e. narrower or wider) field of view than the (first) monochrome camera 253b. The second monochrome camera may capture a second achromatic image and this second achromatic image may be merged with the color image and the (first) achromatic image to produce an enhanced image. In such example embodiments, the enhanced image may have a lesser view (i.e. greater zoom) and/or higher detail level than an enhanced image that is produced by the combination of only the color image and the achromatic image.

In at least some example embodiments, as part of the merging process, the camera application 280 may instead merge the color image with an image captured by only one of the monochrome cameras. In such example embodiments, the camera application 280 may select one of the monochrome cameras for capturing an achromatic image (such a selection may be performed automatically or non-automatically (e.g. by receiving a selection instruction via an input interface 206)) and this captured achromatic image may be merged with the color image to produce the enhanced image. In such cases, the difference in detail level between enhanced images that are each produced by merging the color image with an individual achromatic image captured by a different monochrome camera may depend upon the difference in the field of views of the monochrome cameras.

In at least some example embodiments the third camera may be a color camera which may be referred to as a "second" color camera. This second color camera has a narrower field of view than the "first" color camera 253*a*, but may have a same field of view as or different (i.e. narrower or wider) field of view than the monochrome camera 253*b*. The second color camera may capture a second color image and this second color image may be merged with the (first) color image and the achromatic image to produce an enhanced image. In such example embodiments, the enhanced image may have a lesser view (i.e. greater zoom) and/or higher detail level than an enhanced image that is produced by the combination of only the color image and the achromatic image.

Moreover, these additional cameras (e.g. the third camera) may be in close proximity to the color camera 253*a* and the monochrome camera 253*b* in order to capture images at minimal offsets from images captured by the color camera 253*a* and the monochrome camera 253*b*.

In at least some example embodiments, the monochrome camera 253*b* may include an image sensor that is smaller in size than the image sensor of the color camera 253*a*. For example the monochrome camera 253*b* may include a 0.25 inch wide image sensor while the color camera 253*a* may include a 0.33 inch wide image sensor. In such cases, the image sensor size is directly correlated with the level of detail of the images captured (i.e. the smaller the size of an image sensor, the lesser the level of detail of the image captured). Accordingly, the quality of the enhanced image produced for a given level of digital zoom will be less when an image captured by the monochrome camera 253*b* with a smaller sensor size is used (when merging) as opposed to an image captured by a monochrome camera 253*b* with a larger sensor size. Moreover, the maximum zoom level achievable (prior to the detail level of the enhanced image being the same or less than a conventionally digitally zoomed image) for the monochrome camera 253*b* with a smaller sensor size is also less than when using a monochrome camera 253*b* with a larger sensor size.

Moreover, in at least some example embodiments, the cameras 253*a*, 253*b* may each have different resolutions. For example, the color camera 253*a* may include a 13 MP image sensor while the monochrome camera 253*b* may include a 8 MP image sensor. In such example cases, the color camera 253*a* may capture images at a resolution of 13 MP while the monochrome camera 253*b* may capture images at a resolution of 8 MP. Similarly, the quality of the enhanced image produced for a given digital zoom level will accordingly vary as the detail level of the image captured by the monochrome camera 253*b* (that is used for merging) is dependent on the monochrome camera's 253*b* resolution. Moreover, the maximum zoom level achievable (prior to the detail level of the enhanced image being the same or less than a conventionally digitally zoomed image) will also vary depending on the resolution of the monochrome camera 253*b*.

In at least some example embodiments, the camera application may have access to calibration data associated with one or more of the cameras 253*a*, 253*b* (for example, the calibration data may be calculated (by the camera application 280 or another software module) and stored, for example, in the memory 240 area of the electronic device 201). In at least some example embodiments, the calibration data may be pre-stored in the electronic device 201; for example, it may be stored during manufacture of the electronic device. The calibration data may, for example, be generated by obtaining an image of a specific pattern, grid or array of objects using both the color camera and the achromatic camera and comparing the differences between these images (such as the offset between the two images). The calibration data may represent a measure of compensation for correcting manufacturing offsets and/or distortions of component outputs associated with the cameras 253*a*, 253*b*. In such example embodiments, the camera application 280 may utilize the calibration data as part of the merging process in order to obtain a compensated enhanced image that is corrected for possible output errors associated with the components of the cameras 253*a*, 253*b*.

In at least some example embodiments, the above example embodiments may also be implemented to videos captured by the cameras 253*a*, 253*b*. For example, the color camera 253*a* may capture a color video and the monochrome camera 253*b* may capture an achromatic video. These captured videos may then be merged to produce an enhanced video. The enhanced video may include the color information from the color video and the detail information from the achromatic video. Additionally, the above described cropping process may also be implemented to the captured videos. For example, the color video may be cropped to produce a cropped color video (based on a selection of a digital zoom level). The cropped color video may also be resized to the resolution of the captured color video. The cropped and resized color video may be merged with the achromatic video to produce the enhanced video. Such an enhanced video may have a common resolution as the color video and a common view as the cropped color video.

While the embodiment discussed above includes a processor 240 coupled with a camera application 280 which collectively act as an image signal processor to provide image related functions such as zooming, in other example embodiments (not shown), another processor such as a dedicated image signal processor, may provide some or all of these functions. That is, an image signal processor may be configured to perform the functions of the camera application 280 or a portion thereof.

In at least some example embodiments, the operating system 223 may perform some or all of the functions of the camera application 280. In other example embodiments, the functions or a portion of the functions of the camera application 280 may be performed by one or more other applications. For example, in at least some embodiments, a merging function may be performed within an image editing application (not shown). The image editing application may be an application which allows a user to edit an image. The image editing application may contain processor executable instructions which, when executed, cause the processor 240 to perform merging of images.

Further, while the camera application 280 has been illustrated as a stand-alone application, in at least some example embodiments, the functions of the camera application 280 may be provided by a plurality of software modules. In at least some example embodiments, these software modules may be divided among multiple applications.

Producing an Enhanced Image

Figure 5:
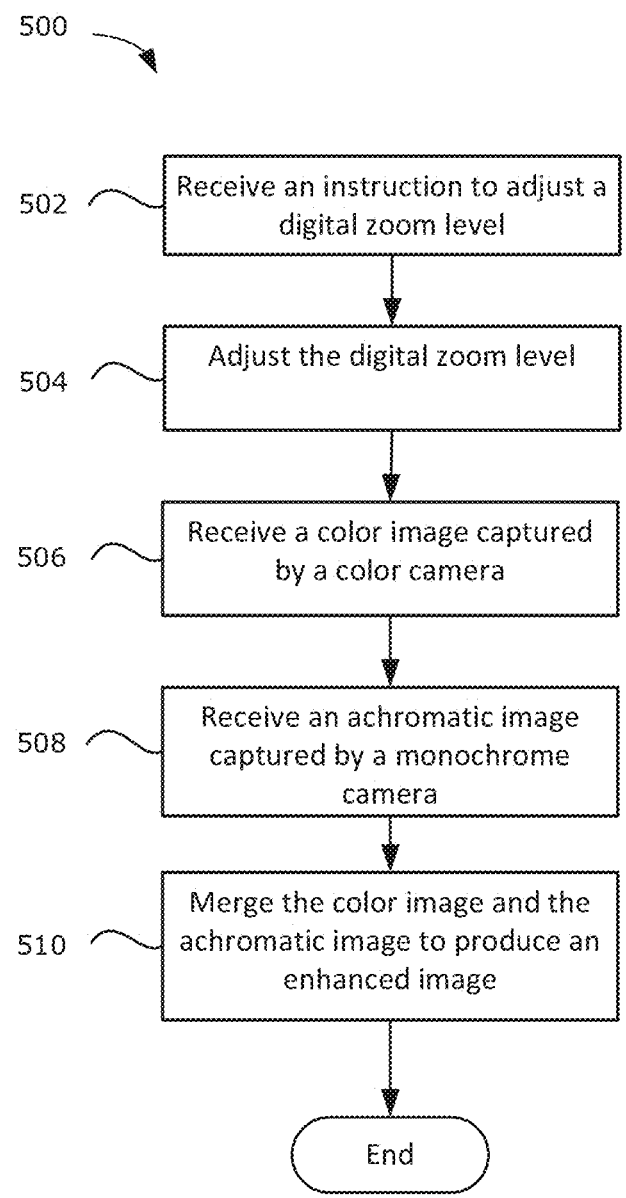
FIG. 5 is a flowchart illustrating an example method of producing an enhanced image in accordance with example embodiments of the present disclosure.

Reference will now be made to FIG. 5 in which an example method 500 of producing an enhanced image is illustrated in flowchart form. The electronic device 201 may be configured to perform the method 500 of FIG. 5. In at least some example embodiments, the processor 240 of the electronic device 201 is configured to perform the method 500 of FIG. 5. One or more applications 225 or modules on the electronic device 201 may contain computer readable instructions which cause the processor 240 of the electronic device 201 to perform the method 500 of FIG. 5. In at least some example embodiments, the camera application 280 stored in memory of the electronic device 201 is configured to perform the method 500 of FIG. 5. More particularly, the camera application 280 may contain computer readable instructions which, when executed, cause the processor 240 to perform the method 500 of FIG. 5.

It will be appreciated that the method 500 of FIG. 5 may, in at least some example embodiments, be provided by other software applications or modules apart from those specifically discussed above. Accordingly, any features which are referred to as being performed by the electronic device 201 may be performed by any one or more of the software applications or modules referred to above or other software modules. In at least some example embodiments, at least some of the method 500 of FIG. 5 may be performed by or may rely on other applications or modules, such as an image editing application.

The method 500 includes, at 502, the electronic device 201 receiving an instruction to adjust a digital zoom level of the color camera 253a. Such an instruction may be received prior to the capture of the color image by the color camera 253a. As mentioned above, the instruction may be a command to crop the color image after it has been captured, and without actually changing features and functionalities of the color camera 253a when capturing the color image. That is, the color camera 253a may capture the color image in the same manner as prior to or after receiving the instruction to adjust the digital zoom level.

Moreover, in at least some example embodiments, the electronic device 201 may provide a viewfinder on the display 204 displaying previews of the cropped color image based on the digital zoom level to be selected. As such, a user may view previews of how the color image appears cropped prior to selection of the zoom function. Additionally, the electronic device 201 may provide any sequence of zoom levels which may be a continuance or discrete sequence of zoom levels. In such example embodiments, the received instruction may be an instruction to select any one of the provided zoom levels for cropping the color image.

In at least some example embodiments, the instruction to adjust the digital zoom level may be received, for example, from an input interface 206 associated with the electronic device 201. For example, the instruction may be received from a navigational input device, such as a trackball, a track pad or a touchscreen display, or a physical keyboard associated with the electronic device 201.

At 504, in response to receiving the instruction, the camera application 280 adjusts the digital zoom level of the color camera 253a. As mentioned above, in at least some example embodiments, it is not the functionalities of the color camera 253a that are being changed. Instead, the electronic device 201 may store and execute the command to crop the color image after the color image has been captured. That is, the electronic device 201, after receiving the instruction, may be programmed to perform the cropping function (according to the zoom level selected) upon capture of the color image.

At 506, the electronic device 201 may receive the color image that is captured by the color camera 253a. For example, the electronic device 201 may receive an instruction (for example, from an input interface 206 associated with the electronic device 201) to command the color camera 253a to capture the color image. In response to receiving such an instruction, the color camera 253a captures the color image, which is subsequently received by the electronic device 201.

In such example embodiments, after the color image is captured by the color camera 253a, the electronic device 201 may further crop the color image based on the selected zoom level to produce a cropped color image. That is, the electronic device 201, upon capture of the color image, performs the earlier received command of cropping the color image to the selected zoom level.

The electronic device 201, at 508, may receive an achromatic image that is captured by the monochrome camera 253b. As mentioned above, the monochrome camera 253b has a narrower field of view than the color camera 253a. As such, the achromatic image has a magnified and lesser view of a scene than the color image. Additionally, in at least some example embodiments, the color camera 253a and the monochrome camera 253b may also have a common resolution. In such cases, the color image and the achromatic image are captured at the same resolution.

It will be appreciated that, in at least some example embodiments, the color image and the achromatic image may be captured at the same time or approximately the same time by the respective cameras 253a, 253b.

At 510, the electronic device 201 merges the color image and the achromatic image to produce an enhanced image. In at least some example embodiments, features from both of the images may be combined to produce the enhanced image. For example, the color information from the color image may be combined with the detail information from the achromatic image to create the enhanced image. As mentioned above, the achromatic image is at a higher detail level than the color image because the monochrome camera 253b is capable of capturing images at a higher detail level than the color camera 253a. Accordingly, the enhanced image includes the preferred attributes of both of the images i.e. colored and at a high detail level.

In at least some example embodiments, when a digital zoom level is selected and a cropped color image is produced based on the selected digital zoom level, the merging process may include merging the cropped color image with the achromatic image to produce the enhanced image (in such example embodiments, prior to merging, the cropped color image may further be resized to the pixel dimension of the color image, and the merging process may include merging the cropped and resized color image with the achromatic image to produce the enhanced image). In at least some example embodiments, the enhanced image may have a common resolution as the color image and a common view as the cropped color image. Additionally, the enhanced image has a common view as the cropped color image. That is, the enhanced image is of the view that the color image is cropped at. As such, the enhanced image is an image that is zoomed and has a higher detail level than the cropped color image (which is an image that is produced by a conventional digital zoom).

The above mentioned example embodiments describe a zoom level that is adjusted prior to the capture of the color image. In at least some example embodiments, the zoom level may instead be adjusted after the capture of the color image and the achromatic image. That is, the images are captured by the cameras 253a, 253b, and subsequently, an instruction is provided to the electronic device 201 to crop the color image. The instruction may be inputted in a similar manner as described above i.e. via an input interface 206 associated with the electronic device 201. In response to receiving the instruction, the electronic device 201 crops the color image to obtain the cropped color image. The cropped color image is similarly merged with the achromatic image to produce the enhanced image.

As mentioned above, in at least some example embodiments, the merging process may include layering of the images to produce the enhanced image. For example, the cropped color image or the color image is layered with the achromatic image. Color information is then extracted from the cropped color image or the color image and detail information is extracted from the achromatic image to produce the enhanced image. If the merging process includes the combination of the cropped color image and the achromatic image, the enhanced image may further have a common resolution as the color image and a common view as the cropped color image.

Additionally, in at least some example embodiments, the cameras 253*a*, 253*b* are directionally aligned and positioned in such a manner with respect to each other in order that there is minimal offset between the captured color image and the achromatic image. As the color image is cropped about a centered area, it may be desired that the achromatic image be substantially centered on the color image (recall that the monochrome camera 253*b* has a narrower field of view than the color camera 253*a*). More particularly, the achromatic image may appear as an optically zoomed version of the color image. In such cases, the cameras 253*a*, 253*b* are positioned so that the offset between the captured images are minimal. For example, the color camera 253*a* and the monochrome camera 253*b* are aligned in a common direction and positioned relative to one another so that the monochrome camera 253*b* may capture an image (i.e. the achromatic image) that is substantially centered on an image (i.e. the color image) captured by the color camera 253*a*.

Moreover, in at least some example embodiments, the ordering of the operations for method 500 may be varied. For example, in at least some example embodiments, 502 and 504 (and associated example embodiments) may be performed after 510. That is, the electronic device 201 may receive a color image captured by the color camera (506) and an achromatic image captured by the monochrome camera (508) (e.g. the electronic device 201 may receive an instruction to capture these types of images by the respective cameras 253*a*, 253*b*). Similarly, in such cases, the monochrome camera 253*b* has a narrower field of view than the color camera 253*a* for capturing images. The captured images may then be merged to produce an enhanced image (510) (e.g. the color information and/or the detail information from the color image may be combined with the detail information from the achromatic image to produce the enhanced image). Subsequently, an instruction may be received to adjust a digital zoom level (502). In such example embodiments, instead of adjusting the digital zoom level of either the color camera 253*a* or the monochrome camera 253*b*, the digital zoom level of the enhanced image is adjusted. That is, an instruction may be input (for example, via the input interface 206) to crop the enhanced image. The enhanced image may then be cropped based on the selected zoom level (i.e. selected level of cropping). In such cases, as described above, the zoomed and enhanced image may have resolution and level of detail in relation to the color and achromatic images that is based on the level of zoom selected and performed.

Furthermore, in at least some example embodiments, 502 and 504 as described above in which the enhanced image is cropped may additionally be performed after 510. That is, 502 to 510 is performed, and subsequently 502 (in which an instruction to adjust the digital zoom level of the enhanced image may be received), and 504 (in which the enhanced image is digitally zoomed (i.e. cropped) based on the received adjustment of the digital zoom level) is again performed. In such example embodiments, cropping of the captured color image (and/or achromatic image) may be performed, the cropped and/or non-cropped images are then merged to produce the enhanced image, and following which, the enhanced image may further be cropped.

Figure 6:
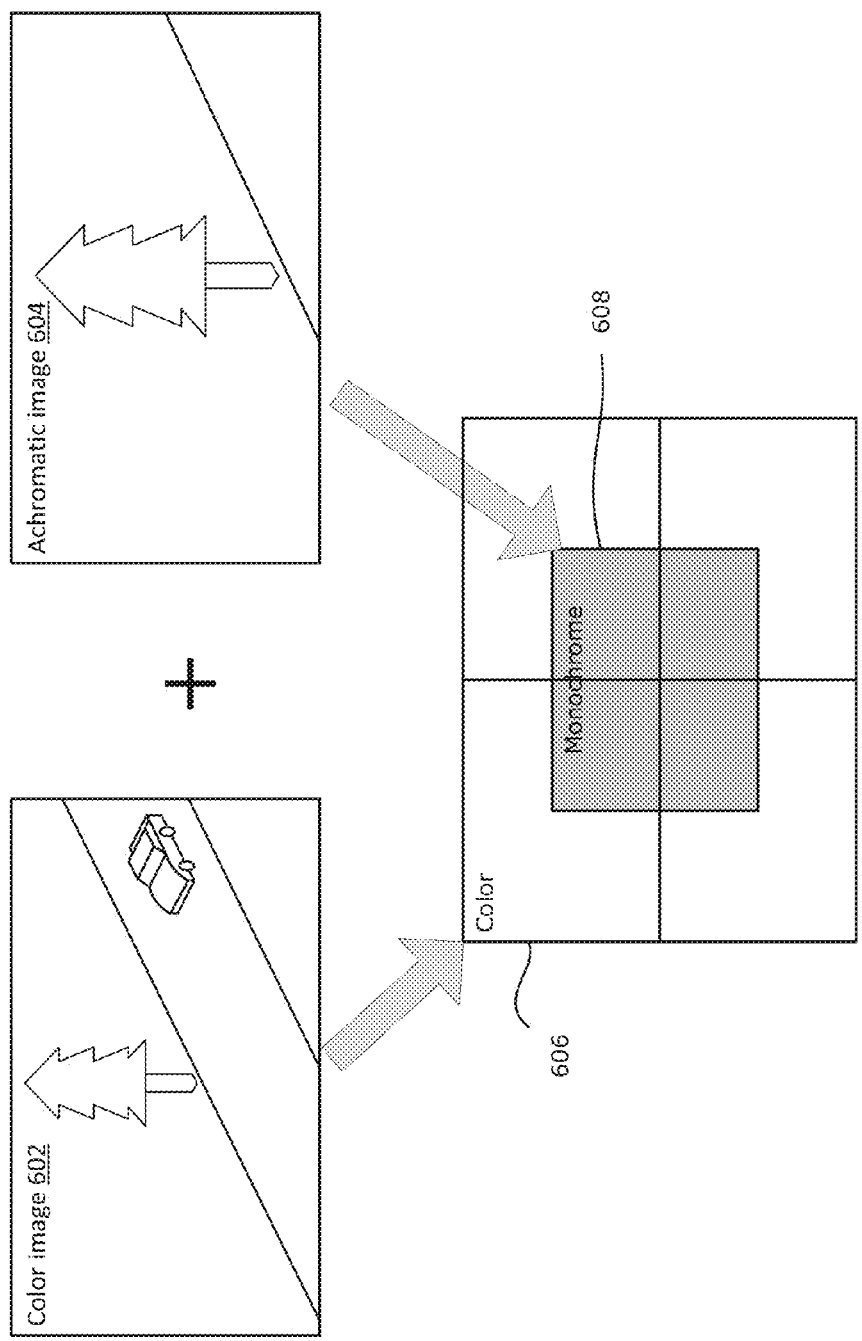
FIG. 6 is an example illustration of images captured by the cameras being merged to produce an enhanced image in accordance with example embodiments of the present disclosure.

Reference is now made to FIG. 6 which shows such an illustration of a color image 602 captured by the color camera 253*a* and an achromatic image 604 captured by the monochrome camera 253*b*. In such example embodiments, the monochrome camera 253*b* has a narrower field of view (more, particularly half the field of view) than the color camera 253*a*. Both cameras 253*a*, 253*b* also have a common resolution. Additionally, the cameras 253*a*, 253*b* are directionally aligned and positioned with respect to each other so as to minimize the offset between the images they capture. As such, the captured achromatic image 604 is substantially centered on and zoomed in relation to the captured color image 602. The achromatic image 604 also has a same resolution as the color image 602. Moreover, the achromatic image may have a detail level that is greater than the color image by a factor of four (recall that due to half the field of view and higher sensitivity of the monochrome camera 253*b* in relation to the color camera 253*a*, the monochrome camera 253*b* may capture four times the level of details as the color camera 253*a*).

The images are illustrated to be merged by an example layering process. As shown, the color image 602 is layered with the achromatic image 604. More particularly, the layering process may include layering the images based on a proportion of each of their respective views of a scene. For example, the color image 602 is shown to encompass the achromatic image 604 because the color image 602 has a greater view of the scene than the achromatic image. More particularly, the color image 602 has a first view 606 that is two times greater on each of the width and height axis than a second view 608 of the achromatic image 604 (accordingly, the color image 602 is four times the view of the achromatic image 604). Additionally, as the achromatic image is substantially centered on the color image, the second view 608 is a substantially centered area of the first view 606.

In such example embodiments, at a 1× digital zoom level selection (i.e. no zoom), the merged enhanced image may have the color (and/or detail) information of the color image 602 for the complete image. The enhanced image may also have the detail level of the achromatic image in an inner region (which represents the second view 608) (in at least some example embodiments, the inner region may include a combination of the detail level of the color image and the achromatic image), and the detail level of the color image in a remainder outer region (which represents the first view 606 excluding the overlapping second view 608). As such, an enhanced image that is both coloured and may have four times the level of detail (within the inner region) as the color image may be produced.

In at least some example embodiments, at a 2× digital zoom selection (i.e. the color image is cropped by a factor of four to produce a cropped color image), as part of the merging process, the cropped color image may identically overlap the achromatic image. That is, the view of the cropped color image is the same as the view of the achromatic image. In such example embodiments, the enhanced image may have the color information of the cropped color image, and the detail level of the achromatic image for the complete image. However, as the cropping may cause the level of detail of the color image to be reduced by a factor of two when producing the cropped color image, the detail level of the enhanced image is also reduced by a factor of two (from a previous factor of four at a 1× digital zoom level). Nevertheless, the enhanced image may still have two times the level of detail as the cropped color image.

Moreover, in at least some example embodiments, at a 4× digital zoom selection (i.e. the color image is cropped by a factor of sixteen to produce a cropped color image), as part of the merging process, the cropped color image may cover only a quarter of the portion of the achromatic image. That is, the view of the cropped color image is less than the view of the achromatic image by a factor of four. In such example embodiments, the enhanced image may include the detail level of only a quarter of the achromatic image. Accordingly, the detail level of the enhanced image is reduced by a factor four (from a previous factor of four at a 1× digital zoom level). Accordingly, the enhanced image may have the same detail level as an equivalent resolution color image. That is, the digital zoom selection is at its threshold where the merging process does not create a more detailed image than conventional digital zooming.

It will be appreciated that although the example embodiments provide exact values for the zoom levels, the detail levels, resolutions, etc. these values are merely approximations. In at least some embodiments, the values may substantially deviate from the values provided due to various factors including variations in the properties of the cameras 253a, 253b.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a pre-recorded storage device or other similar computer readable medium including program instructions recorded thereon may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method implemented by a processor of an electronic device for producing an enhanced image, the method comprising:
   receiving an instruction to adjust a digital zoom level of the color camera;
   receiving a color image that is captured by a color camera;
   receiving an achromatic image that is captured by a monochrome camera, the monochrome camera having a narrower field of view than the color camera, the monochrome camera generating the achromatic image based on visible light, wherein the monochrome camera and the color camera have a common resolution for capturing images, and wherein the achromatic image has more detail than the color image;
   after capturing the color image, cropping the color image based on the adjusted digital zoom level of the color camera to obtain a cropped color image; and
   merging the cropped color image and the achromatic image to produce an enhanced image that has a higher level of detail than the color image.

2. The method of claim 1, wherein the monochrome camera has a field of view that covers half a view of the color camera along each of a width and height axis, and wherein the cropped color image has a lesser view than the color image by a factor of two along each of the width and height axis.

3. The method of claim 1, further comprising:
   receiving an instruction to adjust a digital zoom level of the monochrome camera; and
   after capturing the achromatic image, cropping the achromatic image based on the adjusted digital zoom level of the monochrome camera to obtain a cropped achromatic image,
   wherein the merging includes merging the color image and the cropped achromatic image to produce the enhanced image that has a greater level of detail than the color image.

4. The method of claim 1, wherein the monochrome camera has a field of view that covers half a view of the color camera along each of a width and height axis, and wherein the color image has a greater view than the achromatic image by a factor of two along each of the width and height axis.

5. The method of claim 1, wherein the merging includes combining color information from the color image and detail information from the achromatic image to produce the enhanced image.

6. The method of claim 1, wherein the color camera and the monochrome camera are aligned in a common direction and positioned relative to one another so that the achromatic image captured by the monochrome camera is substantially centered on the color image captured by the color camera.

7. The method of claim 1, further comprising obtaining depth information from the color image and the achromatic image.

8. The method of claim 1, further comprising receiving a third image that is captured by a second monochrome camera, and wherein the merging includes merging the third image with the color image and the achromatic image to produce the enhanced image.

9. The method of claim 1, wherein the monochrome camera includes a folding lens.

10. The method of claim 1, wherein at least one of the cameras is a fixed-focus camera.

11. An electronic device for producing an enhanced image, the electronic device comprising:
a memory;
a color camera and a monochrome camera; and
a processor coupled with the memory, the color camera, and the monochrome camera, the processor being configured to:
receive an instruction to adjust a digital zoom level of the color camera;
receive a color image that is captured by the color camera;
receive an achromatic image that is captured by the monochrome camera, the monochrome camera having a narrower field of view than the color camera, the monochrome camera generating the achromatic image based on visible light, wherein the monochrome camera and the color camera have a common resolution for capturing images, and wherein the achromatic image has more detail than the color image;
after capturing the color image, crop the color image based on the adjusted digital zoom level of the color camera to obtain a cropped color image; and
merge the cropped color image and the achromatic image to produce an enhanced image that has a higher level of detail than the color image.

12. The electronic device of claim 11, wherein the monochrome camera has a field of view that covers half a view of the color camera along each of a width and height axis, and wherein the cropped color image has a lesser view than the color image by a factor of two along each of the width and height axis.

13. The electronic device of claim 11, further configured to:
receive an instruction to adjust a digital zoom of the monochrome camera; and
after capturing the achromatic image, crop the achromatic image based on the adjusted digital zoom level of the monochrome camera to obtain a cropped achromatic image,
wherein the merging includes merging the color image and the cropped achromatic image to produce the enhanced image that has a greater level of detail than the color image.

14. The electronic device of claim 11, wherein the monochrome camera has a field of view that covers half a view of the color camera along each of a width and height axis, and wherein the color image has a greater view than the achromatic image by a factor of two along each of the width and height axis.

15. The electronic device of claim 11, wherein the merging includes combining color information from the color image and detail information from the achromatic image to produce the enhanced image.

16. A non-transitory computer readable storage medium comprising computer executable instructions for producing an enhanced image, the computer executable instructions including instructions for:
receiving an instruction to adjust a digital zoom level of the color camera;
receiving a color image that is captured by a color camera;
receiving an achromatic image that is captured by a monochrome camera, the monochrome camera having a narrower field of view than the color camera, the monochrome camera generating the achromatic image based on visible light, wherein the monochrome camera and the color camera have a common resolution for capturing images, and wherein the achromatic image has more detail than the color image;
after capturing the color image, cropping the color image based on the adjusted digital zoom level of the color camera to obtain a cropped color image; and
merging the cropped color image and the achromatic image to produce an enhanced image that has a higher level of detail than the color image.

* * * * *